United States Patent
Hobson et al.

(10) Patent No.: US 7,469,308 B2
(45) Date of Patent: Dec. 23, 2008

(54) HIERARCHICAL BUS STRUCTURE AND MEMORY ACCESS PROTOCOL FOR MULTIPROCESSOR SYSTEMS

(75) Inventors: Richard F. Hobson, Coquitlam (CA); Bill Ressl, Vancouver (CA); Allan R. Dyck, Port Moody (CA)

(73) Assignee: Schism Electronics, LLC, Wilmington, DE (US)

( * ) Notice: Subject to any disclaimer, the term of this patent is extended or adjusted under 35 U.S.C. 154(b) by 0 days.

(21) Appl. No.: 11/496,746

(22) Filed: Jul. 31, 2006

(65) Prior Publication Data

US 2006/0265533 A1    Nov. 23, 2006

Related U.S. Application Data

(63) Continuation of application No. 10/369,340, filed on Feb. 18, 2003, now Pat. No. 7,085,866.

(60) Provisional application No. 60/358,133, filed on Feb. 19, 2002, provisional application No. 60/358,290, filed on Feb. 19, 2002.

(51) Int. Cl.
*G06F 13/00* (2006.01)
*G06F 13/368* (2006.01)
*G06F 15/167* (2006.01)
*C06C 5/06* (2006.01)

(52) U.S. Cl. .................. 710/120; 709/213; 709/216; 710/100; 710/108; 710/301; 710/302; 711/147; 711/168; 365/63

(58) Field of Classification Search ................ 710/100, 710/108, 147, 120, 301, 302; 345/473; 709/213, 709/216; 711/147, 168; 346/473
See application file for complete search history.

(56) References Cited

U.S. PATENT DOCUMENTS

| | | | |
|---|---|---|---|
| 4,351,025 A | 9/1982 | Hall, Jr. | |
| 4,912,633 A | 3/1990 | Schweizer et al. | |
| 5,586,258 A | 12/1996 | Conterno et al. | |
| 5,734,921 A | 3/1998 | Dapp et al. | |
| 5,752,264 A | 5/1998 | Blake et al. | |
| 5,832,216 A * | 11/1998 | Szczepanek | ............... 709/250 |
| 5,881,254 A * | 3/1999 | Corrigan et al. | ............. 710/306 |
| 5,941,973 A | 8/1999 | Kondo et al. | |
| 6,041,379 A * | 3/2000 | Sher | ........................... 710/316 |
| 6,052,752 A | 4/2000 | Kwon | |
| 6,055,599 A | 4/2000 | Han et al. | |
| 6,092,173 A * | 7/2000 | Sasaki et al. | ................... 712/14 |
| 6,131,153 A * | 10/2000 | Takamatsu | ................... 712/28 |
| 6,151,663 A | 11/2000 | Pawlowski et al. | |
| 6,167,475 A | 12/2000 | Carr | |
| 6,205,522 B1 | 3/2001 | Hudson et al. | |
| 6,212,589 B1 | 4/2001 | Hayek et al. | |

(Continued)

*Primary Examiner*—Khanh Dang
*Assistant Examiner*—Christopher A Daley
(74) *Attorney, Agent, or Firm*—McDonnell Boehnen Hulbert & Berghoff LLP (57) ABSTRACT

A hierarchical bus structure is disclosed in which clusters of processors are arranged and interconnected within a hierarchy to facilitate processor communications via shared memories. The bus structure is well suited for voice processing applications in which clusters of embedded processors process voice streams in parallel, although the architecture is not so limited. Also disclosed is a memory access protocol in which the address and data portions of shared-memory access operations are performed as separate bus transactions that are separated in time, such that multiple concurrent memory access operations from different processors may be interleaved over a shared bus.

40 Claims, 5 Drawing Sheets

U.S. PATENT DOCUMENTS

| | | | |
|---|---|---|---|
| 6,339,788 B1 * | 1/2002 | Geyer et al. | 709/220 |
| 6,351,781 B1 | 2/2002 | Gracias et al. | |
| 6,393,500 B1 * | 5/2002 | Thekkath | 710/35 |
| 6,493,776 B1 | 12/2002 | Courtright et al. | |
| 6,502,150 B1 | 12/2002 | Bogin et al. | |
| 6,526,462 B1 * | 2/2003 | Elabd | 710/242 |
| 6,604,159 B1 * | 8/2003 | Thekkath et al. | 710/110 |
| 6,628,662 B1 | 9/2003 | Blackmon et al. | |
| 6,631,447 B1 | 10/2003 | Morioka et al. | |
| 6,636,950 B1 * | 10/2003 | Mithal et al. | 711/147 |
| RE38,388 E * | 1/2004 | Sarangdhar et al. | 710/105 |
| 6,721,833 B2 * | 4/2004 | Lai et al. | 710/113 |
| 6,738,845 B1 | 5/2004 | Hadwiger et al. | |
| 6,748,505 B1 * | 6/2004 | Dakhil | 711/167 |
| 6,785,793 B2 * | 8/2004 | Aboulenein et al. | 711/167 |
| 6,799,254 B2 | 9/2004 | Oldfield et al. | |
| 6,813,767 B1 * | 11/2004 | Willke | 718/101 |
| 6,842,845 B2 * | 1/2005 | Ganapathy et al. | 712/36 |
| 6,892,266 B2 | 5/2005 | Reimer et al. | |
| 7,107,383 B1 * | 9/2006 | Rajan | 710/306 |
| 7,174,401 B2 * | 2/2007 | Stuber et al. | 710/110 |
| 2001/0003834 A1 | 6/2001 | Shimonishi | |
| 2001/0046237 A1 * | 11/2001 | Chan et al. | 370/419 |
| 2001/0054079 A1 | 12/2001 | Hagersten et al. | |
| 2002/0194435 A1 * | 12/2002 | Yamagami et al. | 711/150 |
| 2003/0097530 A1 * | 5/2003 | Arimilli et al. | 711/146 |

* cited by examiner

FIG. 4

HIERARCHICAL BUS STRUCTURE AND MEMORY ACCESS PROTOCOL FOR MULTIPROCESSOR SYSTEMS

CROSS-REFERENCE TO RELATED APPLICATIONS

The present application is a continuation of U.S. patent application Ser. No. 10/369,340 filed Feb. 18, 2003 now U.S. Pat. No. 7,085,866, which claims the benefit under 35 U.S.C. §119(e) of U.S. Provisional Application No. 60/358,133 filed Feb. 19, 2002 and U.S. Provisional Application No. 60/358,290 filed Feb. 19, 2002. Said U.S. patent application Ser. No. 10/369,340, said U.S. Provisional Application No. 60/358,133, and said U.S. Provisional Application No. 60/358,290 are hereby incorporated by reference herein in their entireties.

FIELD OF THE INVENTION

The present invention relates generally to computer and bus architectures for computing systems that use clusters of processors.

BACKGROUND OF THE INVENTION

Computer buses are typically used to connect a central processing unit (CPU) with other significant resources, such as memory or I/O devices. The CPU typically acts as a master and the other devices typically serve as targets. Master devices are in charge of significant state change decisions in the system and may make arbitrary and unsolicited bus requests, while targets typically respond when something is specifically requested of them. To obtain more system performance, multiple masters may be provided on a common bus. Some masters may not be full CPU's, e.g. a Direct Memory Access (DMA) controller, which typically must be set up by a CPU before it can perform a bus access.

Bus transactions or cycles follow a certain protocol. The most frequent bus cycles are typically for memory reads and memory writes. A typical protocol, for a multiplexed address/data bus, may specify that memory read operations are to proceed generally as follows: (1) a master requests permission from an arbiter to use the bus, and waits for such permission to be granted; (2) the master sends out an address and a bus command that specify a memory read operation; (3) the master gets confirmation that the addressed target can reply in time, or waits; (4) the target puts the requested data on the bus, and the master latches this data and terminates the bus cycle; and (5) the target parks the bus in a known state.

A memory write operation, according to a typical protocol may proceed as follows: (1) the master requests permission from an arbiter to use the bus, and waits until such permission is granted; (2) the master sends out an address and a bus command that specify a memory write operation; (3) the master gets confirmation that the addressed target can reply in time, or waits; (4) the master puts the write data on the bus, and the target latches this data and terminates the bus cycle; and (5) the master parks the bus in a known state.

In the above protocols, step 1 can typically be performed while another master is using the bus. Steps 2 through 5 tie up the bus with 4 or more clock cycles (if a wait occurs). The bus utilization rate is typically 50% or less, since only 2 of these 4 clock cycles are used to perform useful work. When memories are embedded on a chip and system clock rates are high, five or more clock cycles will typically be needed to perform a (pipelined) memory access, and particularly a memory read, resulting in even lower bus utilization.

In some cases, bus utilization can be improved by permitting burst accesses in which several consecutive reads or writes are performed without relinquishing control of the bus. However, burst accesses can cause undesirable delays when several CPU's share a memory, particularly if one CPU hogs the memory.

Another way to improve bus performance, particularly for memory reads, involves the use of a so-called "split-transaction" bus. Once permission is granted for a master to use this bus, the address is transferred to a target in one operation, and the data is returned to the master in another operation, where the bus is free for use in the intervening time interval. This improves the utilization of the bus but adds considerable complexity because (a) the target ordinarily must become a master for returning data, and must know where to return this data, and c) the arbiter services more devices. In some implementations, multiple transactions must be simultaneously monitored in hardware.

Unlike read operations, memory write operations ordinarily are not split. To improve write performance, a bus is commonly separated into separate address and data busses, each with its own arbitration. However, this approach can lead to a large number of signal lines and significant chip area when dozens of processors are to be replicated on the chip.

Parallel processor systems are commonly divided into hierarchical sub-systems or clusters so that bus traffic interference can be limited. Processors often communicate with each other through shared registers or memory. Such communications typically occur over a system bus with features as mentioned above. In many cases, a DMA device is programmed to handle such transfers. Bridging devices may be used to interconnect one bus level with another. This may involve translating one bus protocol to another as well as multiple bus arbitration. General purpose bus arbitration that supports a variety of types of bus traffic and software scenarios is typically used. The arbitration logic is typically not integrally tied to a shared device, although it may be intelligent enough to limit the bus access of a processor.

Many of the above-mentioned difficulties and complexities can be ameliorated by the present invention which, in a preferred embodiment, offers high bus utilization for clusters of processors via an integrated arbitration and shared memory access mechanism with uniformly split (de-coupled) read and write protocols.

SUMMARY OF THE INVENTION

The present invention provides a hierarchical bus structure through which clusters of processors may be arranged and interconnected within a hierarchy to facilitate processor communications via shared memories. The bus structure is well suited for voice processing applications in which clusters of embedded processors process voice streams in parallel, although the architecture is not so limited.

In one embodiment, each cluster comprises a plurality of processors that are connected by a respective shared bus to a respective bus cycle assignment unit. Each bus cycle assignment unit may provide an interface to a respective shared memory, although the shared memories of top level clusters may be omitted. Each bus cycle assignment unit is preferably responsible for assigning slots to the processors within its respective cluster to allow these processors to access the shared memories. The bus cycle assignment units may allocate the slots to the processors according to a round robin type protocol, although other types of protocols may be used.

The processors in a leaf cluster (a cluster with no sibling clusters) can preferably use their respective slots to access the shared memory of that cluster, but not of other clusters. The processors in a non-leaf cluster (referred to as a "root cluster") can use their respective slots to access the shared memory of that cluster (if provided), and to access shared memories of lower level clusters. The bus cycle assignment unit of a sibling cluster may receive and process memory access commands from the processors in that sibling cluster (over the sibling cluster's bus), and from the processors in an immediate parent cluster (over that parent cluster's bus). These two busses may, but need not, be synchronized.

In accordance with another aspect of the invention, the address and data portions of each shared-memory access operation are performed as separate bus transactions that are separated in time. For example, a given processor may perform a first bus transaction to transfer a memory address and associated command to a particular bus cycle assignment unit during its assigned slot. On a subsequent assigned slot (e.g., during the next round robin cycle or after multiple round robin cycles), this processor may perform a second bus transaction to send or receive the data associated with that memory address and command. Between these two bus transactions, some or all of the other processors that can access the same shared memory may perform their own respective transactions. Thus, bus transactions associated with multiple pending memory access operations are interleaved on a bus in a manner that significantly improves bus utilization. In one embodiment, all bus transactions are performed during a single, fixed-length slot that has an effective duration of one clock cycle (pipelined).

Neither this summary nor the following detailed description is intended to define the invention. The invention is defined by the claims.

DETAILED DESCRIPTION OF THE PREFERRED EMBODIMENTS

The present invention provides a hierarchical bus structure through which clusters of processors may be arranged and interconnected within a hierarchy to facilitate processor communications via shared memories. The bus structure is well suited for voice processing applications in which clusters of embedded processors processes voice streams in parallel, although the architecture is not so limited.

The invention also provides an improved memory access protocol and bus interface for controlling processor accesses to a shared memory. This access protocol and bus interface are preferably incorporated into the hierarchical bus structure, but also have independent utility.

I. Overview of Hierarchical Bus Structure

Figure 1:
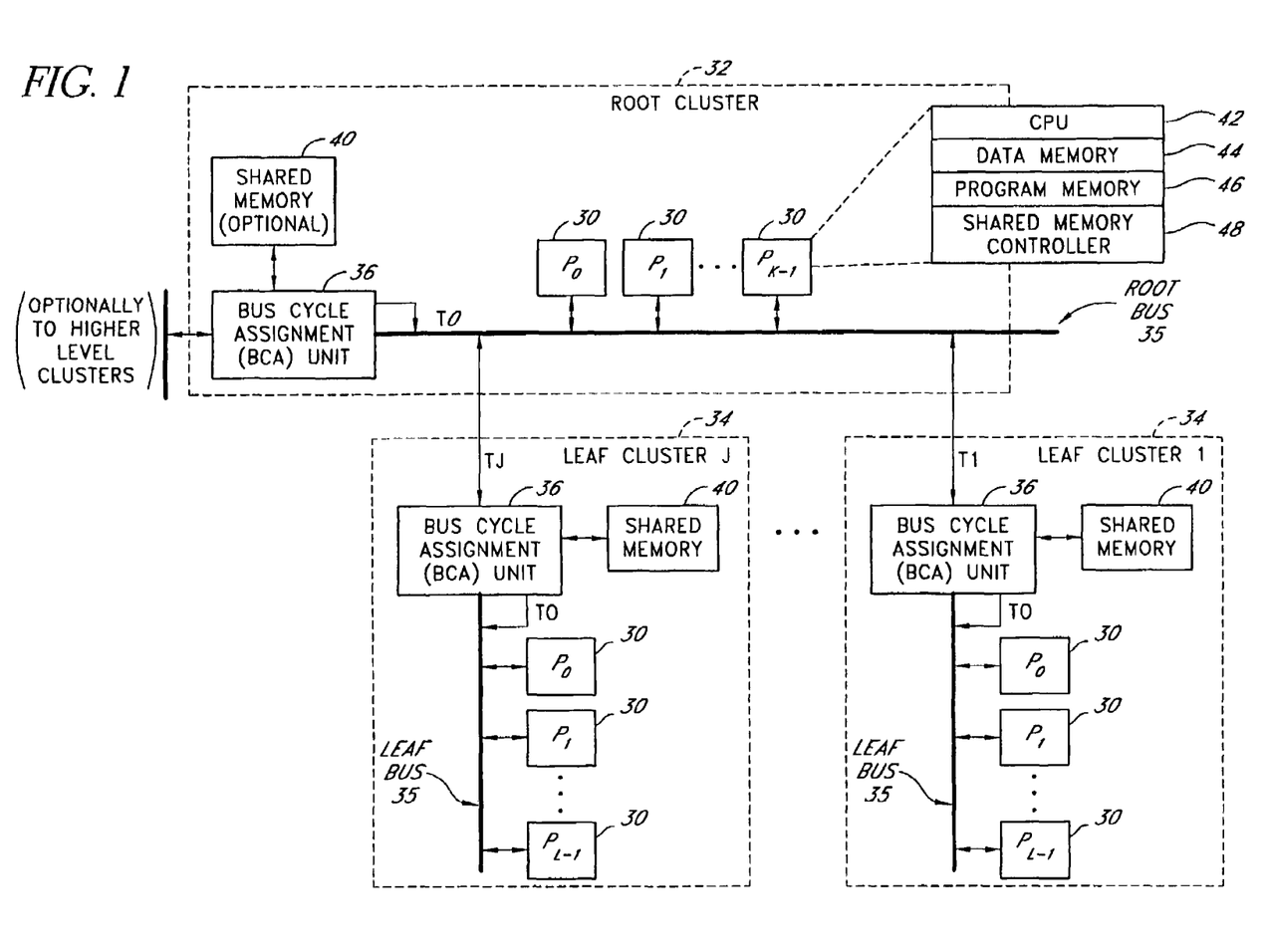
FIG. 1 illustrates a hierarchical arrangement of processor clusters according to one embodiment of the invention.
Figure 2:
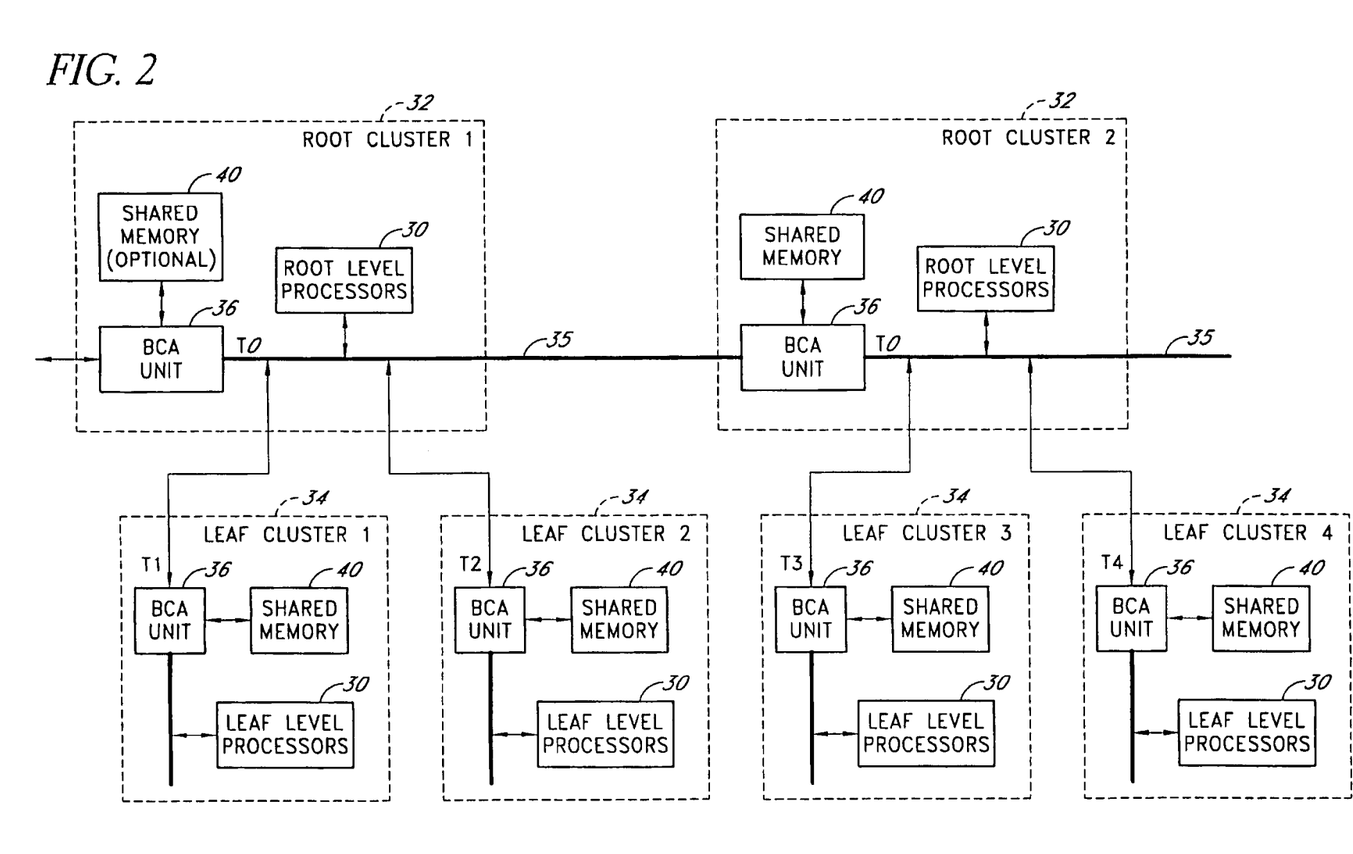
FIG. 2 illustrates a hierarchical arrangement in which two root clusters are joined together to provide three hierarchical levels of processors.

FIG. 1 illustrates a hierarchical processor arrangement in which processors 30 are arranged within a single root cluster 32 and J leaf clusters 34. (A cluster is referred to herein as a "leaf" cluster if it does not have any sibling clusters, and is referred to as a root cluster otherwise.) The root cluster 32 has K processors 30, and each leaf cluster 34 contains L processors 30. Additional root clusters 32 may be provided, as depicted in FIG. 2 and described below. The processors 30 in the root cluster or clusters 32 are referred to as "root level processors" or "parent processors." The processors 30 in the leaf clusters 34 are referred to as "leaf level processors."

The processors in each cluster 32, 34 are connected by a respective cluster bus 35 to a respective Bus Cycle Assignment (BCA) unit 36. Each Bus Cycle Assignment unit 36 is connected and provides an interface to a respective shared memory 40, and controls processor accesses to that memory in-part by assigning memory access cycles to specific processors 30. The Bus Cycle Assignment units preferably are not general purpose bus arbiters, but rather are dedicated to controlling processor access to the shared memories 40. The number of processors 30 that share a given memory 40 can be selected to suit the bandwidth requirements of a particular application, such as voice channel processing. Typical ranges for L, K, and J are as follows L=4-10; K=3-6, and J=4-10. One factor that influences these numbers is the minimum number of cycles required to complete a memory read request from the time it is issued. This might be 4 cycles (pipelined), including the issuing cycle. Thus if L=4, a processor can issue a read request and have data ready for use on the very next allocated bus cycle, as described below.

Each root level and leaf level processor 30 operates as a master on its respective bus 35, meaning that it initiates transfers on that bus. Each Bus Cycle Assignment unit 36, on the other hand, acts only as a target, meaning that it does not initiate bus transfers. Bus masters (processors) 30 can issue shared-memory access commands to a target (Bus Cycle Assignment unit 36) during an assigned bus cycle or slot, as described below. Each leaf level processor 30 can only issue commands to the BCA unit 36 of its own respective cluster 34, and thus has only one target (although, by symmetry with the root, each leaf cluster could be expanded). Each root level processor 30 in FIG. 1 can issue commands to all of the BCA units 36 shown, and thus has J+1 potential targets (designated as T0, T1, . . . TJ on the root bus 35).

Each Bus Cycle Assignment unit 36 acts as the bus master controller (designated as "target 0" or "T0") for its respective bus 35, and is responsible for generating an "enhanced" round robin bus cycle assignment sequence for accessing its respective shared memory 40. During each such round robin cycle, each Bus Cycle Assignment unit 36 preferably allocates one equal-length memory access slot to each processor 30 within its respective cluster 32 or 34, as described in the following subsection. During each such slot, the selected processor 30 can send a memory access command to that Bus Cycle Assignment unit 36 or, if the processor is a root level processor, to a lower level Bus Cycle Assignment Unit 36. When a BCA unit 36 receives a memory access command from a higher-level processor 30 (i.e., a processor in a higher level cluster), this command will be sent during a slot assigned by the BCA unit of that higher level cluster 32, as opposed to a slot assigned by the receiving BCA unit. Although a round robin or "enhanced" round robin sequence is preferred, other timeslot allocation protocols may be used, including contention protocols in which processors 30 compete for use of a slot.

In the preferred embodiment, each Bus Cycle Assignment unit 36 may be accessed (to access the corresponding shared memory 40) only by those processors 30 connected directly to that Bus Cycle Assignment unit by a single bus 35. Thus, in the configuration of FIG. 1, each shared memory 40 within a leaf cluster 32 can be accessed by the processors 30 within that leaf cluster (but not other leaf clusters) and by the root level processors 30. The shared memory 40 of the root cluster 32 may be omitted, and if provided, is accessible by the root processors 30 and not the leaf processors. Leaf level processors may communicate with each other via a software mechanism that runs on a root processor and understands how to relay information from one shared memory to another.

Although one root cluster 32 is shown in FIG. 1, multiple root clusters 32 may be provided. For example, as depicted in FIG. 2, two root clusters 32 may be provided, and each of these root clusters 32 may have a respective set of two or more leaf clusters 34 below it (two leaf clusters per root cluster shown). In this example, three levels of processors exist: leaf clusters 3 and 4 are at the lowest level of the hierarchy; root cluster 2 and leaf clusters 1 and 2 are one level higher, and root cluster 1 is at the highest level. In this configuration, the processors 30 of root cluster 1 can access the shared memories 40 of root clusters 1 and 2 (note that the shared memory of root cluster 2 is not optional in the preferred embodiment) and leaf clusters 1 and 2, but cannot (directly) access the shared memories 40 of leaf clusters 3 and 4. The processors 30 of root cluster 2 can access the shared memories 40 of root cluster 2 and leaf clusters 3 and 4, but cannot access the shared memories 40 of root cluster 1 or leaf clusters 1 and 2. An additional level of clusters could be provided below leaf clusters 1 and 2 (making them root clusters), in which case the hierarchy would be in the form of a 3-level symmetrical tree.

As mentioned above, the shared memories 40 of the root clusters 32 may optionally be omitted. If a shared memory 40 is omitted from a root cluster 34, a Bus Cycle Assignment unit 36 is still provided within that cluster to control the timing of processor accesses to lower level shared memories 40. For example, with reference to FIG. 1, if the shared memory 40 of the root cluster 32 is omitted, the root cluster's Bus Cycle Assignment unit 36 will still be provided to control the timing with which the K root level processors issue commands to the J leaf level Bus Cycle Assignment.

Each network of clusters shown in FIGS. 1 and 2 may be implemented within a single chip, such as a System-on-Chip (SOC) device. The processors 30 depicted in FIGS. 1 and 2, and especially the root level processors, may have additional input/output (I/O) connections (not shown) to communicate, for example, with an off-chip device. To conserve silicon area, each shared memory 40 is preferably implemented as a single-port memory (SRAM or DRAM), rather than a multi-port memory as in some prior art systems.

As illustrated for one of the processors 30 in FIG. 1, each leaf level and root level processor 30 preferably includes a central processing unit (CPU) 42 connected to a local data memory 44, a local program memory 46, and a Shared Memory Controller 48. The CPUs 44 may be Pipelined Embedded Processors (PEP™), as described in Hobson et al, "An Embedded-Processor Architecture for Parallel DSP Algorithms," Advanced Signal Processing Algorithms, Architectures, and Implementation Conference, Denver Colo., August 1996, pp. 75-85, the disclosure of which is incorporated herein by reference. Various other types of processor architectures may additionally or alternatively be used within a given IC device. The data memories 44 may be used to receive inputs from, and provide outputs to, one or more higher-level processors or I/O devices.

The program memories 46 may be configured to store individual "code pages," or short sequences of code, currently being executed by the processors. A group of processors 30, possibly including processors from multiple clusters 30, may be configured to execute like code pages in parallel to process different respective data sets or streams. One possible architecture that may be used to dispatch code pages to multiple processors 30 in parallel, and to monitor and control processor execution of such code pages, is described in a concurrently-filed U.S. utility patent application titled Processor Cluster Architecture and Associated Parallel Processing Methods (U.S. patent application Ser. No. 60/358,290), the disclosure of which is hereby incorporated by reference. When such an architecture is used, a single code distribution bus (not shown) may connect to some or all of the processors 30 of the IC device, and may be used to load like code pages into the program memories 46 of multiple processors in parallel.

The Shared Memory Controllers 48 are responsible for controlling processor bus accesses. Each Shared Memory Controller implements the host or "master" side of a memory access protocol to access its respective bus 35. The client or "target" side of this protocol is implemented within each Bus Cycle Assignment unit 36. As described in the following subsections, an important aspect of this memory access protocol, in the preferred embodiment, is that it de-couples an address portion of each memory access operation (read or write) from a corresponding data portion of the memory access operation. (i.e., the address and data portions are performed as separate bus transactions). This in turn allows a high level of bus utilization to be achieved.

II. Allocation and Use of Slots

As indicated above, a round robin type protocol may be used to allocate bus cycles or slots to processors 30 within each cluster. This protocol preferably has some or all of the following attributes: (a) one, equal-length slot is allocated to each processor 30 within the given cluster 32 or 34 on each round robin or other cycle the protocol; (b) these slots occur in a particular sequence or order, and this order may but need not be fixed from one cycle to cycle; (c) the slot allocations occur automatically, meaning that a processor 30 need not request a slot before that slot is allocated (although in some embodiments, a processor may be permitted to relinquish its slot, making that slot available to another processor); (d) the slots allocated to the processors within the cluster may be delayed to accommodate requests from higher level processors. In some embodiments, the BCA units 36 may be permitted to re-order slots dynamically (e.g., by reversing the positions of two processors in the round robin sequence) in order to improve performance.

Bus transactions performed in consecutive slots (by different processors 30) overlap with each other in time as the result of pipelining, and as a result, effectively take only one clock cycle to complete. During each slot within a sibling cluster 32 or 34, the cluster's BCA unit 36 may receive a bus command from an immediate parent processor 30. For example, referring to FIG. 1, suppose that parent processor P0 in the root cluster 32 issues a memory access command to the BCA unit 36 of leaf cluster 1. This command would be issued during a memory access slot assigned by the BCA unit 36 of the root cluster 32, and this slot may coincide in time with a memory access slot allocated to one of the processors 30 within leaf cluster 1. Thus, the BCA unit 36 of leaf cluster 1 may receive two commands simultaneously, one from a leaf level processor and one from a root level processor.

To accommodate the concurrent receipt of commands from different busses 35, commands may be appropriately queued or buffered within the BCA units 36 until completed (see FIG. 4, discussed below). In addition, as mentioned above, a BCA unit 36 may suspend its round robin cycle as needed to manage the flow of incoming commands from the processors 30 within its own cluster. As described below, a BCA unit 36 can also reject a bus transaction request from a processor 30, forcing that processor to retry the bus transaction during a subsequent slot. In one embodiment, queued root level read requests are given a higher priority access to the shared memory than leaf level read requests.

If there are L processors 30 in each leaf cluster 34 (as in FIG. 1), each such processor can perform a bus transaction every L clock cycles in the preferred embodiment, assuming no interference from root processors. If root interference exists (as the result of commands received from immediate parent processors 30), a leaf-level processor may be forced to retry some operations, and/or may have its slot delayed while commands from the parent processors are being serviced. In order to give equal shared memory access to root and leaf level processors 30 in the preferred embodiment, only 1 transaction per processor can be queued at a time to a particular shared memory 40. Other embodiments may permit more transaction queuing, especially for writing.

III. De-coupling of Memory Access Bus Transactions

To improve bus utilization, the address and data portions of each memory access operation are preferably performed as separate bus transactions. For example, a given processor 30 may perform a first bus transaction to transfer a memory address and associated command to a particular target (BCA unit 36) during its assigned slot. On a subsequent assigned slot (during the next round robin cycle or after multiple round robin cycles), this processor may perform a second bus transaction to send or receive the data associated with that memory address and command. Between these two bus transactions, some or all of the other processors 30 that can access the same shared memory 40 may perform their own respective transactions. Thus, several memory access operations may be pending on a given bus 35 at a given time—each of which is initiated by a different master/processor 30.

In the following description, the term "memory access operation" will be used generally to refer to the set of bus transactions performed in order to complete a memory read or write operation. As described below, a memory access operation in the preferred embodiment requires two bus transactions, and may involve additional transactions if a requested data transfer cannot be immediately completed.

To illustrate how address and data portions of memory read and write operations may be de-coupled, assume there are only two levels of processors 30, as shown in FIG. 1. In addition, assume that the memory access protocol defines the following de-coupled, single-cycle bus transactions (commands): read-address (RA), read-data (RD), write-address (WA), write-data (WD), no-operation (NOP), and possibly others. In addition, assume that there are four processors per cluster, and that the associated Bus Cycle Assignment units 36 allocate slots to these masters according to a pure round robin protocol. The following examples illustrate how memory read and write operations may be performed in such a configuration by a processor.

a. Shared-Memory Read Operation (Table 1)

Table 1 illustrates a shared-memory read operation by Master 1, which may be either a root level processor or a leaf level processor. The notation "?" indicates that the associated leaf bus 35 is assigned to some-master other than Master 1 during the relevant slot. During its assigned slot in round robin cycle 1, Master 1 (through its Shared Memory Controller 48) issues a read-address (RA) command to one of its targets 36. The next three timeslots are then allocated to Masters 2, 3 and 4, respectively, each of which may or may not use its slots. When a bus master 30 does not use an allocated slot, it preferably issues a "NOP" (no-operation) command.

TABLE 1

De-coupled shared memory read operation

| | Round Robin Cycle: | | |
|---|---|---|---|
| | 1 | 2 | 3 |
| Master 1 (slot 1): | RA | RD | RD |
| Master 2 (slot 2): | ? | ? | ? |
| Master 3 (slot 3): | ? | ? | ? |
| Master 4 (slot 4): | ? | ? | ? |

During its assigned timeslot of round robin cycle 2, Master 1 issues a read-data (RD) command to the same target 36 to request the data associated with the prior RA transaction. If Master 1 is a root level processor, it may alternatively use this second round robin cycle to perform a transaction with a different target 36, as described below.

In response to the RD command, the target 36 places the requested data on the bus 35 if that data is ready, and asserts a VALID signal to indicate that valid data is present on the bus (see bus interface description below). If the data is not ready, Master 1 may issue another RD command to this target during the third round robin cycle, and subsequent cycles if necessary, until the target 36 responds with the requested data.

As illustrated by this example, an important aspect of the memory access protocol is that the master 30, and not the target 36, initiates both the address and data portions of memory access operations. As a result, a master 30 (and particularly a root-level master) may initiate one or more memory access operations with other targets 36 while its memory access with the first target is still pending. For example a root processor 30 may issue a read-address (RA) command to leaf cluster 1 (i.e., to the Bus Cycle Assignment unit 36 of leaf cluster 1); then issue a read-address command to leaf cluster 2, then issue a read-data (RD) command to leaf cluster 1, then issue a read-data command to leaf cluster 2. The distinction between targets may be made via decoding a small portion of the address, so designated, by the SMC, or through a programmable control register that the SMC consults before choosing a target.

The following is an example sequence of assembler code that may be executed by the processors 30 to perform shared memory reads of the type depicted in Table 1.

```
move ra1, SMC, m_read
wait:
    bif smcNrdy, wait
    move SMC, rd1
```

In this example, a memory access operation is requested using general register ra1 for an address. The address is copied to the processor's Shared Memory Controller (SMC) 48 along with an m_read (memory read) request. A conditional branch (bif) is issued to wait for the read result. The returned data value is moved into general register rd1. The SMC 48 does all of the bus interfacing as a result of the m_read request. The busy-wait loop can be replaced with more productive code, such as code that issues commands to other targets 36.

b. Shared-Memory Write Operation:

Table 2 illustrates a shared-memory write operation by Master 1. In this example, Master 1 issues a write-address (WA) command to a particular target 36 during its assigned slot of round robin cycle 1. During its next assigned slot, Master 1 issues a write-data (WD) command to the same target 36, during which it places the write data on the associated bus 35. In order to avoid the occasional retry associated with WA (if the last write has not yet completed), a write queue can be used for 2 or more transactions.

TABLE 2

De-coupled shared memory write operation

| | Round Robin Cycle: | |
|---|---|---|
| | 1 | 2 |
| Master 1 (slot 1): | WA | WD |
| Master 2 (slot 2): | ? | ? |
| Master 3 (slot 3): | ? | ? |
| Master 4 (slot 4): | ? | ? |

The following sequence of assembler code may be executed by the processors 30 to perform shared-memory write operations as in Table 2. In this example, the address is copied from general register ra1 to the processor's SMC 48 along with a m_write (memory write) request. The SMC handles all bus interfacing.

```
move ra1, SMC, m_write
move rd1, SMC
```

Although the design preferably requires the WA transaction to precede the WD transaction (as in the example above) the BCA units 36 may alternatively require that the WD transaction be performed first, or may allow either the WA or the WD transaction to be performed first. Having WA precede WD may provide useful information earlier, thereby helping to simplify the hardware of the BCA units.

IV. Bus Interface and Timing

An example set of bus interface signals that may be used to implement the cluster busses 35 is illustrated in Table 3. The numbers of signal lines (bits) shown for each signal are provided for illustrative purposes, and may be varied as needed based on the number of processors per cluster and other design factors.

TABLE 3

Example Bus Interface

| Signal name | Bits | Description |
|---|---|---|
| MASTER_SEL | 3 | Selected master (processor); driven by target T0 two clock cycles before actual address/data transfer (and clocked at the next rising edge); sequences through L leaf processors. May also have a "slot 0" or "wait" state which reserves the bus for immediate parent processors or reset |
| CMD | 3 | Bus command; driven by selected processor in clock cycle prior to actual address or data transfer (and clocked at next rising edge). |
| TARGET_SEL | 3 | Selected target (Bus Cycle Assignment unit); driven by selected processor in clock cycle prior to actual address or data transfer (and clocked at next rising edge). The TARGET_SEL lines may be omitted on the leaf busses since only one valid target exists on each leaf bus. |
| ADDR/DATA | 32 | Memory address or data (depending upon command type) |
| VALID | 1 | Driven by target (Bus Cycle Assignment unit); indicates whether data is ready. |
| BUS_ERROR | 1 | An optional signal that can be driven by targets to indicate bus errors (possibly for testing purposes). |
| BUS_RESET | 1 | Optionally driven by targets to initiate bus reset operations |

An important aspect of the bus design is that the number of signal lines is small (41-44 in this example for root busses, and 38-41 for leaf busses), making it practical to embed a large number processors 30 (e.g., 40 or more) within a single integrated circuit device. The small number of signal lines is achieved in-part by using a multiplexed address/data bus rather than separate address and data busses. Although a multiplexed address/data bus is preferred, it is not required.

In one embodiment, the number of MASTER_SEL lines provided on a given leaf bus is sufficient to provide a unique master ID for each of the leaf processors on that leaf bus plus one shared master ID for all of the immediate parent (root processors). For example, a value of zero (corresponding to "slot zero" or a "wait state") may be reserved for all requests from the root processors. As described below, slot zero may be inserted into the round robin cycle in a given leaf cluster as needed to postpone requests from leaf processors, so that pending requests from root processors may be serviced.

In a preferred embodiment, bus transactions are performed at a rate of one bus transaction per clock cycle (as the result of pipelining) when all slots are used. Each slot may thus be treated as a single clock cycle, although the bus transaction performed within a "slot" may actually take multiple clock cycles to complete (see Tables 4 and 5, discussed below). The assignment of a bus "slot" to a master/processor 30 is preferably performed two clock cycles (or alternatively, some predetermined number of clock cycles) in advance of the address or data portion of a particular bus transaction, as indicated in the following timing examples. Although bus transactions effectively take only one clock cycle to complete in the preferred embodiment, it should be understood that the invention is not so limited.

The timing example of Table 4 depicts master (processor) 3 sending a read-address (RA) command to Target 5. Master 3 sees its slot address (also referred to as a "master address") two cycles (T-2) before the ADDR/DATA bus becomes available. During the following clock cycle (T-1), master 5 asserts the CMD and TARGET_SEL signals to specify the command and target. (It is assumed in this example that Master 3 is a root processor, and therefore has multiple targets; on leaf level busses, the TARGET_SEL lines may be omitted.) Finally, during clock cycle T (which may be thought of as Master 3's slot), Master 3 drives the ADDR/DATA lines with the shared memory address associated with the RA command.

TABLE 4

Example Timing for Read-Address Bus Transaction

|  | Clock cycle: | | |
| --- | --- | --- | --- |
|  | T-2 | T-1 | T |
| MASTER_SEL: | 3 | 0 (wrapped) | 1 |
| CMD: | ?? | RA | ?? |
| TARGET_SEL: | ?? | 5 | ?? |
| ADDR/DATA: | ?? | ?? | addr M3 to T5 |
| VALID: | ?? | ?? | true (if ready) |

The VALID signal driven to either TRUE of FALSE by target 5 to indicate whether the request has been accepted. If the valid signal is FALSE, the master 30 may perform a retry operation. This may happen if the master's software improperly attempts to issue a second read request to the same target 36 before the first one has completed.

The notation "??" in Table 4 indicates that the particular signal is not being used by Master 5 during the relevant clock cycle. These signal lines may, however, be used by other processors 30 during such clock cycles. Because the processors 30 overlap their respective transactions (i.e., the transactions are pipelined), each bus transaction effectively takes only 1 clock cycle.

Table 5 illustrates example timing for a read-data (RD) transaction initiated by master/processor 3. As with the RA transaction, Master 3 sees its address on MASTER_SEL at T-2, and drives the CMD and TARGET_SEL lines at clock cycle T-1 (the target is again T5 in this example). If the data is ready during clock cycle T, target 5 places this data on the ADDR/DATA lines, and asserts a TRUE signal on the VALID line; otherwise, target 5 drives the VALID signal to FALSE.

TABLE 5

Example Timing for Read-Data Bus Transaction

|  | Clock cycle: | | |
| --- | --- | --- | --- |
|  | T-2 | T-1 | T |
| MASTER_SEL: | 3 | 0 (wrapped) | 1 |
| CMD: | ?? | RD | ?? |
| TARGET_SEL: | ?? | 5 | ?? |
| ADDR/DATA: | ?? | ?? | data T5 to M3 |
| VALID: | ?? | ?? | true (if ready) |

The timing example of Table 6 shows Master 1 sending a write-address command to Target 6. Master 1 sees its slot address two clock cycles (T-2) before its assigned slot, and specifies its command (WA) and target during the following clock cycle (T-1). During its actual slot (T), Master 1 places the write address on the ADDR/DATA bus. The target responds by asserting VALID=TRUE if it is ready to receive the write address, and otherwise drives VALID to the FALSE state. The sequence for the write-data (WD) command is preferably the same, except that the write address is replaced with write data in clock cycle T.

TABLE 6

Example Timing for Write-Address Bus Transaction

|  | Clock cycle: | | |
| --- | --- | --- | --- |
|  | T-2 | T-1 | T |
| MASTER_SEL: | 1 | 2 | 3 |
| CMD: | ?? | WA | ?? |
| TARGET_SEL: | ?? | 6 | ?? |
| ADDR/DATA: | ?? | ?? | addr M1 to T6 |
| VALID: | ?? | ?? | true (if ready) |

As illustrated by the timing examples above, an important aspect of the preferred embodiment is that all bus transactions are performed in the same amount of time (one clock cycle pipelined, and two clock cycles total if the command/target selection cycle is counted). As a result, there is no need for a BCA unit 36 to vary the lengths of the slots for certain types of bus transactions. This greatly simplifies the design of the BCA units 36, and facilitates pipelining of bus transactions.

Figure 3A:
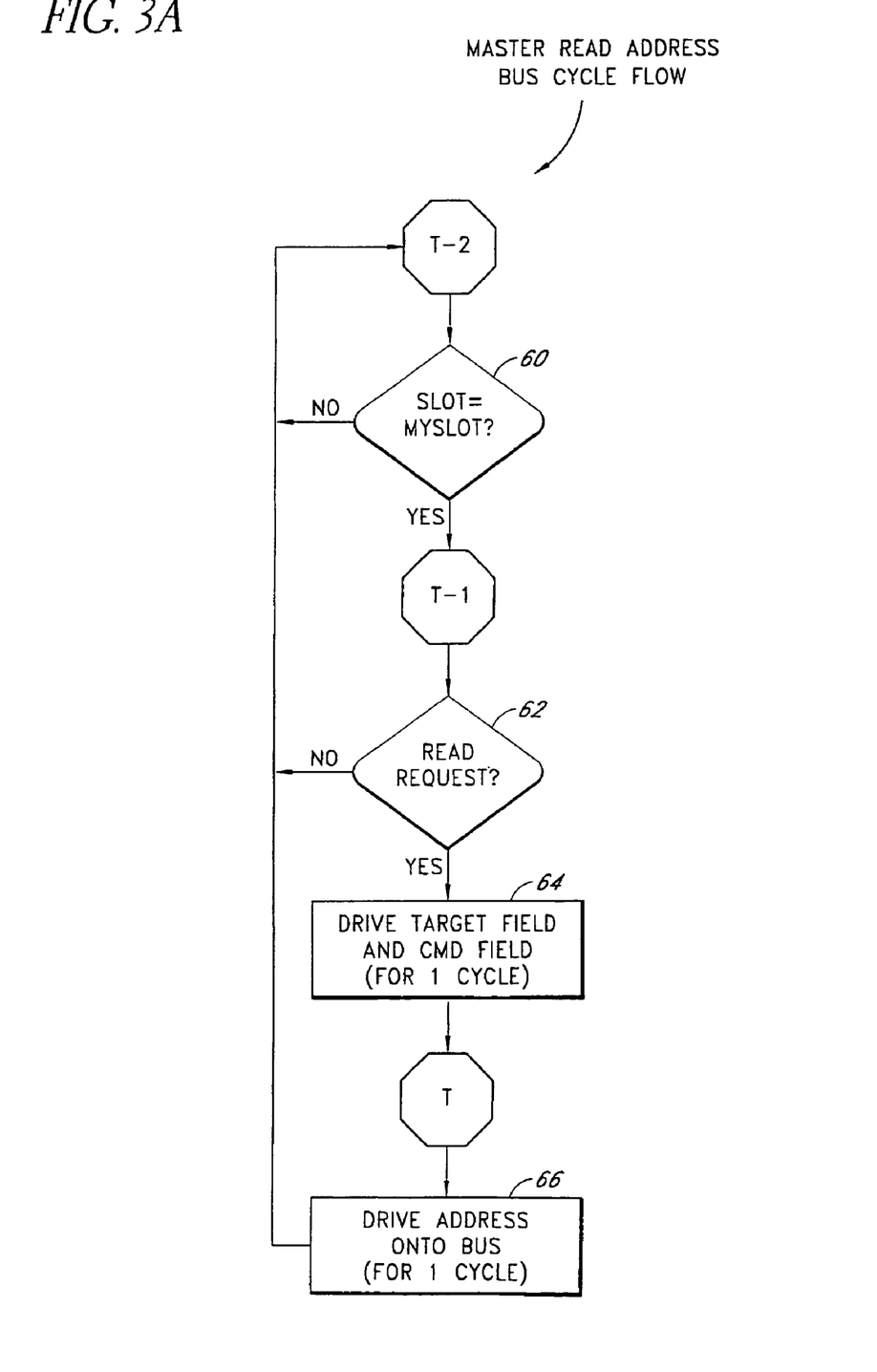
FIG. 3A illustrates the logic flow that may be implemented by a processor's shared memory controller to perform a read-address (RA) bus transaction.

FIG. 3A illustrates the logic flow that may be implemented by each processor 30 (and more specifically, each processor's Shared Memory Controller 48) to perform a read-address (RA) bus transaction. As depicted by block 60, the processor 30 initially checks the MASTER_SEL lines for its slot address, and repeats this process on subsequent clock cycles until this slot address appears. During the clock cycle after this address appears (cycle T-1), the processor 30 drives the TARGET_SEL and CMD lines if it has a read request to issue (blocks 62 and 64). During the clock cycle after asserting TARGET_SEL and CMD (cycle T), the processor 30 places the read address on the ADDR/DATA lines for one clock cycle (block 66).

Logic flows that may be used to implement the master side of RD, WA and WD transactions will be apparent from FIG. 3A and from the timing examples above.

Figure 3B:
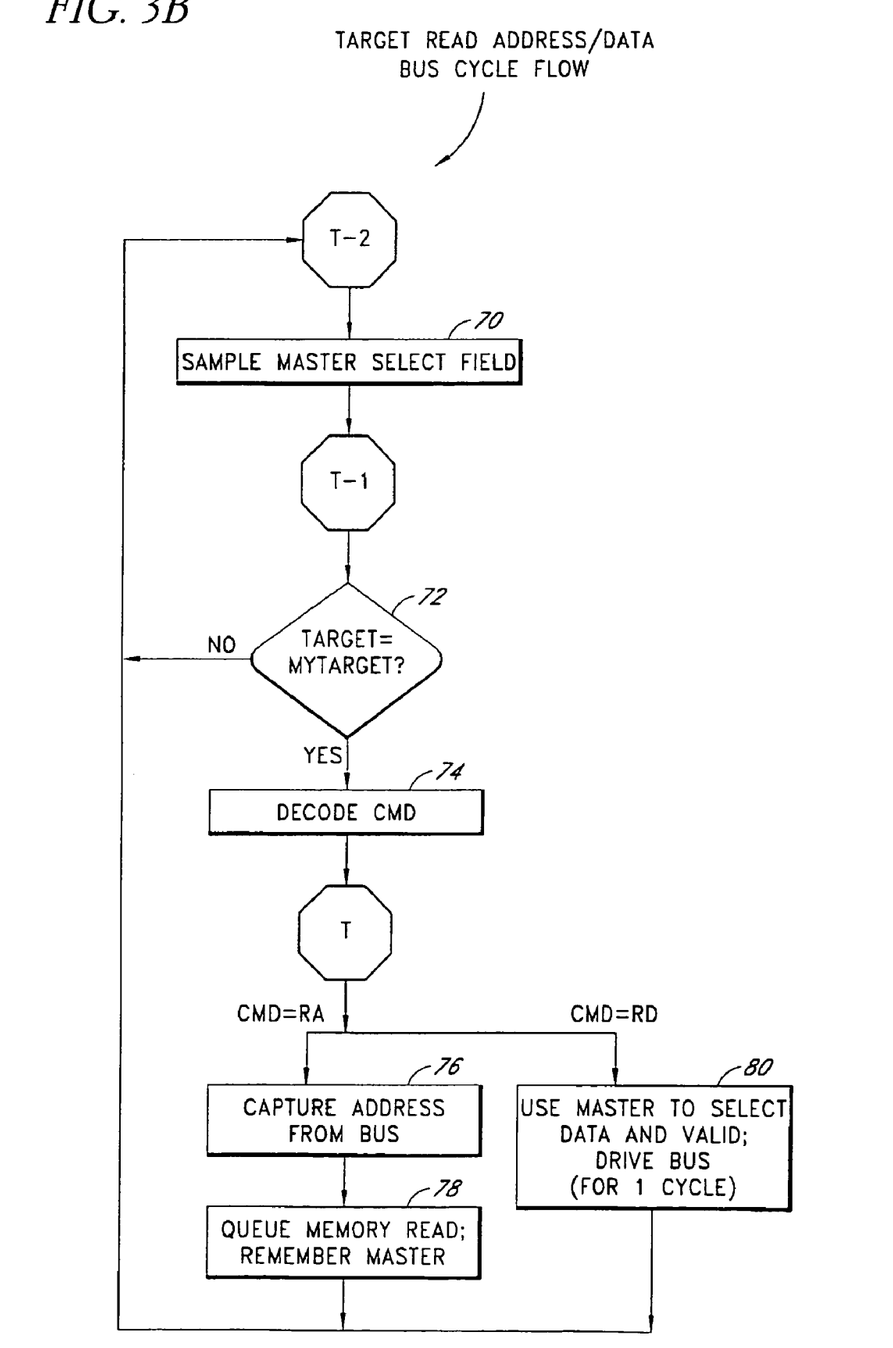
FIG. 3B illustrates the logic flow that may be implemented by a Bus Cycle Assignment unit to perform read-address (RA) and read-data (RD) bus transactions.

FIG. 3B illustrates the logic flow that may be implemented within the Bus Cycle Assignment units (targets) 36 to process read-address (RA) and read-data (RA) commands. As depicted by block 70, the BCA unit 36 samples the MASTER_SEL lines during cycle T-2 to record the identity of the master whose slot will occur during clock cycle T. During the following clock cycle (T-1), the BCA unit 36 checks the TARGET_SEL lines for its target ID (block 72), and returns to its starting state if not selected as the target. If selected as the target, the BCA unit 36 also obtains and decodes the command present on the CMD lines during T-1. If the decoded command is an RA command, the BCA unit 36 latches the memory read address (block 76), and queues this read address in association with the requesting master's ID (block 78), during clock cycle T. If the decoded command is an RD command, the BCA unit 36 checks an internal table to see if the read data has been retrieved from the shared memory 40 (see FIG. 4, described below). If the data is available, it is placed on the ADDR/DATA bus and the VALID line is driven to TRUE; otherwise, the VALID line is driven to FALSE (block 80).

V. BCA Architecture (FIG. 4)

Figure 4:
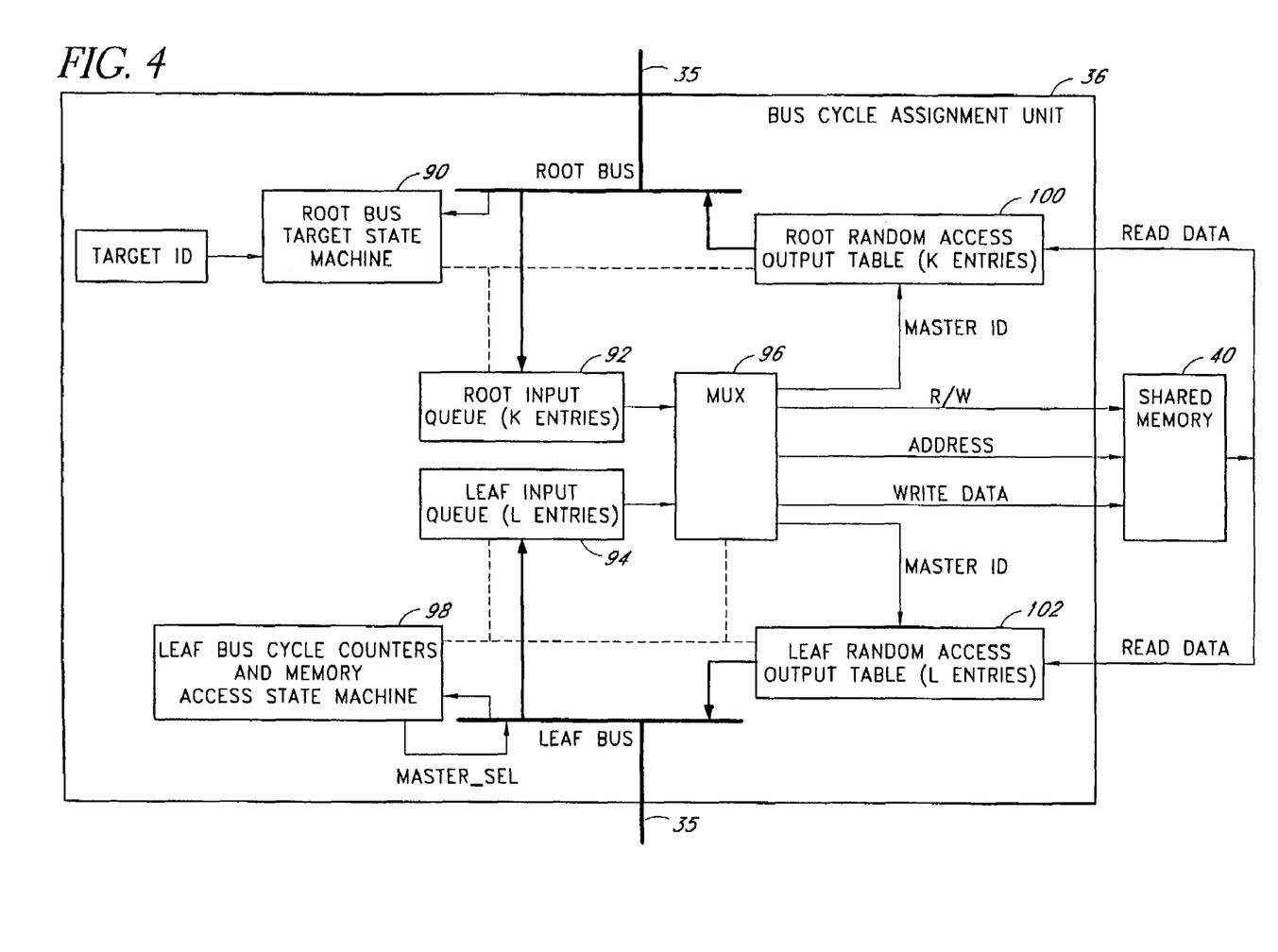
FIG. 4 shows a block diagram of a Bus Cycle Assignment unit according to one embodiment of the invention.

FIG. 4 illustrates a Bus Cycle Assignment (BCA) unit block diagram for one embodiment of the invention. For purposes of illustration, it is assumed in this example that the BCA unit resides within a leaf cluster 34. The same design may be used within root clusters 32, although some functionality may be omitted—particularly if no shared memory 40 is provided in the particular root cluster. Root bus target activity is supported in the illustrated BCA unit for K root level processors, and leaf bus activity is supported for L leaf level processors. In some embodiments, the root bus can be out of phase with respect to the leaf bus (a synchronizer may be used).

The BCA unit 36 includes a root bus target state machine 90 that compares target IDs on the TARGET_SEL lines of the root bus 35 to its own target ID. No such comparisons are needed on the leaf bus 35 in the preferred embodiment, as this BCA unit 36 will always be the target of any bus transactions initiated by processors 30 on this leaf bus.

Commands received from the root bus 35 are placed in a root input queue 92 in time slot order together with the associated master ID, and memory address or data. Commands received from the leaf bus 35 are similarly placed in a leaf input queue 94 in time slot order together with the associated master ID, and memory address or data. The root input queue 92 has K entries (i.e., can hold K commands), one for each processor 30 on the root bus 35. The leaf input queue 92 has L entries, one for each processor 30 on the leaf bus 35.

Although not illustrated in FIG. 4, each queue 92, 94 includes logic for matching each write address (received as part of a WA transaction) with its corresponding write data (received as part of a separate, WD transaction). For example, when a WA transaction is performed by a particular processor 30, the write address may be held within the queue 92 or 94 until the corresponding write data is received as part of a WD transaction from the same processor. As mentioned above, the BCA unit 36 may also (or alternatively) support the ability for the WD transaction to be performed before the WA transaction. Regardless of the particular ordering used, the write address and data are combined within the queue 92 or 94 to form a single write-memory command.

A multiplexer (MUX) 96 selects between the two input queues 92, 94 to select RA (read-address) and write-memory commands to issue to the shared memory 40 (RD commands need not be queued since they only involve output tables). In one embodiment, the multiplexer 96 selects between the input queues 92, 94 so as to allocate approximately the same amount of memory-access bandwidth to each root and leaf level processor 30. Regardless of the selection mechanism used, the BCA unit 34 may generate wait states (suspend the round robin cycle) on the leaf bus 35, and/or assert VALID=FALSE to reject bus commands, as needed to manage incoming command traffic.

In an alternative embodiment, the multiplexer 96 is omitted, and the shared memory 40 is implemented using a dual-port random access memory. This approach allows both root-level and leaf-level access requests to be processed concurrently, but at the cost of increased silicon area.

The block labeled "leaf bus cycle counters and memory access state machine" 98 in FIG. 4 is responsible for assigning slots to leaf level processors according to a round robin or other slot assignment protocol. As described above, slots are assigned by placing master IDs on the MASTER_SEL lines. A zero or other special value may be reserved for root level processors. For example, the BCA unit may place a zero on MASTER_SEL once per round robin cycle, and may maintain this "slot 0" state until all commands in the root input queue 92 have been processed. Slot zero may alternatively be inserted into a round robin cycle when (a) a command exists in the root input queue 92, (2) two or more commands exist in the root input queue, or (c) a command has existed within the root input queue 92 for at least one full round robin cycle. In some embodiments, slot 0 can be used for additional control (e.g. it may be repeated to block access to the bus, as an alternative to using the VALID bit for that purpose). Block 98 may also drive the bus reset and bus error signals described above.

With further reference to FIG. 4, data read from the shared memory 40 is temporarily stored in a root random access output table 100 or a leaf random access output table 102, depending upon whether the associated RD command came from a root processor or a leaf processor. The root random access output table 100 has one entry for each of the K root processors, and the leaf random access output table 102 has one entry for each of the L leaf processors. Each entry in these tables 100, 102 corresponds uniquely to a particular master/processor 30. When an RD command is selected by a state machine 90, 98, the ID of the master is used to select the corresponding table entry. If this entry is populated with read data, this data is driven on the corresponding bus 35 while asserting VALID=TRUE, and the table entry is cleared; otherwise, the VALID line is driven to FALSE.

As mentioned above, the processors 30 are preferably programmed such that a given processor cannot have multiple concurrently-pending memory access operations with the same BCA unit 36.

A complete memory operation in the above implementation takes two bus cycles (slots), and these cycles are typically spread apart by one round robin cycle (and possibly multiple round robin cycles). Additional clock cycles may be used if the target is not ready, as described above. Since all slots can be used in principle, bus utilization factors approaching 100% are possible. In practice, the processors 30 typically will not use all of their slots on all round robin cycles. Thus, although bus utilization of 100% (or near 100%) may be achieved during those round robin cycles in which all processors use their respective slots (assuming no interference from higher level processors), the average bus utilization over an extended period of time may be about 60%-80%.

Root level processors may have the additional capability of initiating multiple read/write transactions, one per leaf level cluster, without waiting for these transactions to complete. Since root level master slots are repeated every K cycles, writing data to J clusters can be completed in about 2*J*K cycles (not counting possible software overhead). If all J data values were consecutively written to the same leaf cluster it could take over J*(2*K+L) cycles (assuming equal root/leaf write priority), which may easily be twice as long.

A more aggressive bus cycle allocation method may be used so that unused slots can be acquired by other bus masters. This may improve performance for some applications, but worst case performance is still limited by the total number of masters connected to a BCA unit 36.

The present invention thus comprises an efficient method for grouping multiple processors into a cluster with a shared memory and a bus for memory access. Multiple clusters are arranged into a hierarchy in which the lowest level clusters are leaf clusters, and higher level clusters are root clusters. Each level of clustering preferably has a bus for memory access. Each leaf cluster processor preferably has a built-in bus interface (Shared Memory Controller) for access to the clusters shared memory 40, and can access higher-level shared memories indirectly via a parent processor.

VI. Voice Channel Processing

The above-described architecture is well suited for telecommunication voice channel processing. A standard voice channel operates at a 64 kbps rate. The aggregate bus bandwidth required for hundreds of voice channels is very low compared with the available bandwidth of the present architecture when operating at or near 300 MHz with 32-bit bus widths.

One or two root level processors 30 can be assigned to voice data I/O tasks while the leaf level processors are used for signal processing activities, such as echo cancellation and voice compression. If necessary, another root level processor 30 may be used to access an off-chip memory.

Each leaf level processor 30 may use its local data memory 44 to store frequently accessed channel information (such as voice echo tail history). Fresh data may be copied from the cluster shared memories 40 into local data memories 44 on input, and returned in real-time as processed data on output.

Although this invention has been described in terms of certain preferred embodiments and applications, other embodiments and applications that are apparent to those of ordinary skill in the art, including embodiments and applications which do not provide all of the features and advantages set forth herein, are also within the scope of this invention. Accordingly, the scope of the present invention is intended to be defined only by reference to the appended claims.

What is claimed is:

1. An apparatus, comprising:
   means for sending a write command or a write address, or combinations thereof, from a first bus master in a plurality of bus masters to a bus cycle assignment unit over a bus in a first bus transaction initiated by the first bus master, wherein the bus cycle assignment unit is configured for allocating bus cycles to each bus master in the plurality of bus masters on the bus to control accesses to a shared memory;
   means for sending write data from the first bus master to the bus cycle assignment unit over the bus in a second bus transaction initiated by the first bus master, the write data corresponding to the write command or write address, or combinations thereof, sent in the first transaction; and
   means for using the write address or the write data, or combinations thereof, received by the bus cycle assignment unit to perform a write operation to the shared memory, wherein bus masters other than the first bus master may perform memory access operations on the bus between the initiation of the first bus transaction and the completion of the second bus transaction, wherein the memory access operations include transferring data to or from the shared memory.

2. The apparatus of claim 1, further comprising means for sending the write address or the write data, or combinations thereof, from the first bus master to the bus cycle assignment unit over a common set of bus signal lines such that separate address and data buses are not required on the bus.

3. The apparatus of claim 1, wherein the plurality of bus masters comprise embedded processors embedded within a single integrated circuit (IC).

4. The apparatus of claim 1, further comprising means for performing the first and second bus transactions during respective equal or nearly equal length slots allocated to the first bus master by the bus cycle assignment unit.

5. The apparatus of claim 1, further comprising means for allocating the bus cycles to the plurality of bus masters according to a protocol in which each bus master in the plurality of bus masters is configured to be allocated an equal length or nearly equal length slot in a sequence.

6. The apparatus of claim 1, further comprising means for allocating the bus cycles to each bus master in the plurality of bus masters according to a round robin type protocol.

7. The apparatus of claim 1, further comprising means for sending a write command or a write address, or combinations thereof, from a bus master in the plurality of bus masters to a bus cycle assignment unit over a bus in an additional bus transaction initiated by the bus master between the initiation of the first bus transaction and the completion of the second bus transaction such that multiple bus transactions are pending concurrently.

8. The apparatus of claim 1, wherein each of the plurality of bus masters are configured for initiating more than one transaction in the bus cycle assignment unit without waiting for any of the more than one transactions to complete.

9. The apparatus of claim 1, wherein each bus master in the plurality of bus masters is configured for processing voice data for voice channel processing.

10. The apparatus of claim 9, wherein each of the plurality of bus masters is configured for echo cancellation and voice compression.

11. An apparatus, comprising:
    means for sending a read command or a read address, or combinations thereof, from a first bus master in a plurality of bus masters to a bus cycle assignment unit over a bus in a first bus transaction initiated by the first bus master, wherein the bus cycle assignment unit is configured for allocating bus cycles to each bus master in the plurality of bus masters on the bus to control accesses to a shared memory;
    means for performing a read operation to retrieve read data from the shared memory in response to receiving the read command or the read address, or combinations thereof, within the bus cycle assignment unit;
    means for storing the read data in the bus cycle assignment unit in association with the first bus master; and
    means for sending the read data over the bus from the bus cycle assignment unit to the first bus master in a second bus transaction initiated by the first bus master, wherein bus masters other than the first bus master may preform memory access operations on the bus between the initiation of the first bus transaction and the completion of the second bus transaction, wherein the memory access operations include transferring data to or from the shared memory.

12. The apparatus of claim 11, further comprising means for sending the read address or the read data, or combinations thereof, between the first bus master and the bus cycle assignment unit over a common set of bus signal lines such that separate address and data buses are not required on the bus.

13. The apparatus of claim 11, wherein the plurality of bus masters comprise embedded processors embedded within a single integrated circuit (IC).

14. The apparatus of claim 11, further comprising means for performing the first bus transaction or the second bus transaction, or combinations thereof, during respective equal length or nearly equal length slots allocated to the first bus master by the bus cycle assignment unit.

15. The apparatus of claim 11, further comprising means for allocating the bus cycles to the plurality of bus masters according to a protocol in which each bus master in the plurality of bus masters is configured to be allocated an equal length or nearly equal length slot in a sequence.

16. The apparatus of claim 11, further comprising means for allocating the bus cycles to the plurality of bus masters according to a round robin type protocol.

17. The apparatus of claim 11, further comprising means for performing an additional bus transaction between the initiation of the first transaction and the completion of the second transaction, the additional bus transaction being directed to a second bus cycle assignment unit to access a second shared memory.

18. The apparatus of claim 11, wherein each of the plurality of bus masters are configured for initiating more then one transaction in the bus cycle assignment unit without waiting for any of the more than one transactions to complete.

19. The apparatus of claim 11, wherein each bus mater in the plurality of bus masters is configured for processing voice data for voice channel processing.

20. The apparatus of claim 19, wherein each of the plurality of bus masters is configured for echo cancellation and voice compression.

21. An article comprising a storage medium having stored thereon instructions that, when executed, result in the execution of a method of performing a read operation to access a shared memory, the method comprising:

in a first bus transaction initiated by a bus master, sending a read command and a read address from the bus master to a bus cycle assignment unit over a bus, wherein the bus cycle assignment unit allocates bus cycles to each of a plurality of bus masters on the bus to control accesses to a shared memory;

in response to receiving the read command and read address within the bus cycle assignment unit, performing a read operation to retrieve read data from the shared memory, and storing the read data in the bus cycle assignment unit in association with the bus master; and in a second bus transaction initiated by the bus master, sending the read data over the bus from the bus cycle assignment unit to the bus master, wherein other bus masters may perform transactions on the bus between the first and second bus transactions.

22. The article of claim 21, wherein the read address and the read data are sent between the bus master and the bus cycle assignment unit over a common set of bus signal lines, such that separate address and data buses are not required on the bus.

23. The article of claim 21, wherein the bus masters are embedded processors.

24. The article of claim 21, wherein the first and second bus transactions are performed during respective, equal-length slots allocated to the bus master by the bus cycle assignment unit.

25. The article of claim 21, wherein the method further comprises the bus master initiating a second read operation on said bus after said first bus transaction and before said second bus transaction, such that multiple read operations initiated by the bus master are pending concurrently.

26. The article of claim 21, wherein the bus cycle assignment unit allocates the bus cycles to the bus masters according to a round robin type protocol.

27. The article of claim 21, wherein the method comprises the bus master performing an additional bus transaction after the first transaction but before the second transaction, said additional bus transaction being directed to a second bus cycle assignment unit to access a second shared memory.

28. The article of claim 21, wherein at least one of said other bus masters performs a bus transaction on the bus after the first bus transaction and before the second bus transaction.

29. An article comprising a storage medium having stored thereon instructions that, when executed, result in the execution of a method of performing a write operation to access a shared memory, the method comprising:

in a first bus transaction initiated by a first bus master, sending a write command and a write address from the first bus master to a bus cycle assignment unit over a bus, wherein the bus cycle assignment unit allocates bus cycles to each of a plurality of bus masters on the bus to control accesses to a shared memory;

in a second bus transaction initiated by the first but master, sending write data from the first bus master to the bus cycle assignment unit over the bus, said write data corresponding to the write command and write address sent in the first transaction; and using the memory address and memory data received by the bus cycle assignment unit to perform a write operation to the shared memory, wherein bus masters other than the first bus master may perform transactions on the bus between the initiation of the first bus transaction and the completion of the second bus transaction.

30. The article of claim 29, wherein the write address and the write data are sent between the first bus master and the bus cycle assignment unit over a common set of bus signal lines, such that separate address and data buses are not required on the bus.

31. The article of claim 29, wherein the bus masters are embedded processors.

32. The article of claim 29, wherein the first and second bus transactions are performed during respective, equal-length slots allocated to the first bus master by the bus cycle assignment unit.

33. The article of claim 29, wherein the method further comprises the first bus master initiating a second write operation on said bus between said initiation of said first bus transaction and said completion of said second bus transaction, such that multiple write operations initiated by the first bus master are pending concurrently.

34. The article of claim 29, wherein the bus cycle assignment unit allocates the bus cycles to the plurality of bus masters according to a round robin type protocol.

35. The article of claim 29, wherein the method comprises the first but master performing an additional bus transaction between the initiation of the first transaction and the completion of the second transaction, said additional bus transaction being directed to a second bus cycle assignment unit to access a second shared memory.

36. The article of claim 29, wherein at least one of said other bus masters performs a bus transaction on the bus between the initiation of the first bus transaction and the completion of the second bus transaction.

37. A method, comprising:

sending a write command or a write address, or combinations thereof, from a first bus master in a plurality of bus masters to a bus cycle assignment unit over a bus in a first bus transaction initiated by the first bus master, wherein the bus cycle assignment unit is configured for allocating bus cycles to the plurality of bus masters on the bus to control accesses to a shared memory;

sending write data from the first bus master to the bus cycle assignment unit over the bus in a second bus transaction initiated by the first bus master, the write data corresponding to the write command or write address, or combinations thereof, sent in the first transaction; and using the write address or the write data, or combinations thereof, received by the bus cycle assignment unit to perform a write operation to the shared memory, wherein bus masters other than the first bus master may perform memory access operations on the bus between the initiation of the first bus transaction and the completion of the second bus transaction, wherein the memory access operations include transferring data to or from the shared memory.

38. The method as claimed in claim 37, further comprising processing voice data for voice channel processing by the first bus master.

39. A method, comprising:

sending a read command or a read address, or combinations thereof, from a first bus master to a bus cycle assignment unit over a bus in a first bus transaction initiated by the first bus master, wherein the bus cycle assignment unit is configured for allocating bus cycles to a plurality of bus masters on the bus to control accesses to a shared memory;

performing a read operation to retrieve read data from the shared memory in response to receiving the read command or the read address, or combinations thereof, within the bus cycle assignment unit;

storing the read data in the bus cycle assignment unit in association with the first bus master; and sending the read data over the bus from the bus cycle assignment unit to the first bus master in a second bus transaction initiated by the first bus master, wherein bus masters other than the first bus master may perform memory access operations on the bus between the initiation of the first bus transaction and the completion of the second bus transaction, wherein the memory access operations include transferring data to or from the shared memory.

40. The method as claimed in claim 39, further comprising processing voice data for voice channel processing by the first bus master.

* * * * *